(12) United States Patent
Vishwakarma et al.

(10) Patent No.: US 12,248,889 B2
(45) Date of Patent: Mar. 11, 2025

(54) STOCHASTIC RISK SCORING WITH COUNTERFACTUAL ANALYSIS FOR STORAGE CAPACITY

(71) Applicant: EMC IP Holding Company LLC, Hopkinton, MA (US)

(72) Inventors: Rahul Deo Vishwakarma, Kolkata (IN); Bing Liu, Tianjin (CN); Parmeshwr Prasad, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 961 days.

(21) Appl. No.: 17/153,294

(22) Filed: Jan. 20, 2021

(65) Prior Publication Data
US 2022/0230083 A1     Jul. 21, 2022

(51) Int. Cl.
  *G06N 7/01*     (2023.01)
  *G06F 3/06*     (2006.01)

(52) U.S. Cl.
  CPC ............. *G06N 7/01* (2023.01); *G06F 3/0653* (2013.01)

(58) Field of Classification Search
  CPC ....... G06N 7/01; G06F 12/023; G06F 3/0641; G06F 3/0653
  See application file for complete search history.

(56) References Cited

U.S. PATENT DOCUMENTS

| 11,281,577 | B1 * | 3/2022 | Karumbunathan ... G06F 3/0688 |
| 2014/0052907 | A1 | 2/2014 | Starr |
| 2019/0108888 | A1 * | 4/2019 | Sarkar ................ G06F 3/0616 |
| 2019/0303368 | A1 | 10/2019 | Liu et al. |
| 2020/0192572 | A1 * | 6/2020 | Dwarampudi ......... G06F 3/064 |
| 2020/0349013 | A1 | 11/2020 | Chang et al. |
| 2021/0174258 | A1 * | 6/2021 | Wenchel ............... G06N 5/045 |
| 2021/0390457 | A1 * | 12/2021 | Romanowsky ......... G06N 5/04 |
| 2022/0091763 | A1 * | 3/2022 | Perneti ................ G06F 3/0653 |
| 2022/0114494 | A1 * | 4/2022 | Sousa ................... G06N 3/044 |
| 2022/0261156 | A1 | 8/2022 | Liu et al. |

OTHER PUBLICATIONS

Kumar, Revathi Anil, and Mark Chamness. "Stochastic Estimated Risk for Storage Capacity." arXiv preprint arXiv:1901.10552 (2018), pp. 1-8 (Year: 2018).*

Lundberg, Scott M., and Su-In Lee. "A unified approach to interpreting model predictions." arXiv:1705.07874v2 (2017), pp. 1-10 (Year: 2017).*

(Continued)

*Primary Examiner* — Andrew L Tank
(74) *Attorney, Agent, or Firm* — Workman Nydegger

(57) ABSTRACT

One example method includes accessing a dataset, selecting a list of attributes of the dataset, each of the attributes being selected based on a determination that the attribute is affecting growth of the dataset and affecting an amount of data storage space consumed by the dataset, assigning a SHAP score to each attribute, using the SHAP scores to assign respective weights to each attribute, deriving drift and shock information for the dataset, and based on the drift and shock information, calculating a risk score that a storage capacity of an asset where the dataset is stored will be exhausted within a particular time interval.

20 Claims, 8 Drawing Sheets

(56) References Cited

OTHER PUBLICATIONS

Mahajan, Divyat, Chenhao Tan, and Amit Sharma. "Preserving causal constraints in counterfactual explanations for machine learning classifiers." arXiv preprint arXiv:1912.03277 (2019), pp. 1-19 (Year: 2019).*

Leopoldo Bertossi. "Score-Based Explanations in Data Management and Machine Learning" arXiv:2007.12799v2 (2020) (Year: 2020).*

Snow, Derek, Machine Learning in Asset Management (Jul. 16, 2019). JFDS: https://jfds.pm-research.com/content/2/1/10, http://dx.doi.org/10.2139/ssrn.3420952 (Year: 2019).*

J. Ren et al., "Archivist: A Machine Learning Assisted Data Placement Mechanism for Hybrid Storage Systems," 2019 IEEE 37th International Conference on Computer Design (ICCD), Abu Dhabi, United Arab Emirates, 2019, pp. 676-679, doi: 10.1109/ICCD46524.2019.00098. (Year: 2019).*

C. Vaughn et al., "Soothsayer: Predicting Capacity Usage in Backup Storage Systems," 2015 IEEE 23rd International Symposium on Modeling, Analysis, and Simulation of Computer and Telecommunication Systems, Atlanta, GA, USA, 2015, pp. 208-217, doi: 10.1109/MASCOTS.2015.40. (Year: 2015).*

TomAF, "Computing SHAP Values from scratch", hhttps://web.archive.org/web/20191118011147/https://afiodorov.github.io/2019/05/20/shap-values-explained/, The Wayback Machine Nov. 18, 2019, pp. 1-9 (Year: 2019).*

Simona Maggio, "Why Is My Data Drifting?", https://web.archive.org/web/20210112103447/https://blog.dataiku.com/why-is-my-data-drifting, The Wayback Machine Jan. 12, 2021, pp. 1-6 (Year: 2021).*

Wikipedia, "Shapley Value", https://en.wikipedia.org/wiki/Shapley_value, retrieved prior to Jan. 20, 2021.

Lundberg, Scott, "Welcome to the SHAP documentation", https://shap.readthedocs.io/en/latest/, retrieved prior to Jan. 20, 2021.

Jugovac, Michael, and Dietmar Jannach. "Interacting with recommenders—overview and research directions." ACM Transactions on Interactive Intelligent Systems (TiiS) 7.3 (2017): 1-46. https://dl.acm.org/doi/pdf/10.1145/3001837 (Year: 2017).

* cited by examiner

STOCHASTIC RISK SCORING WITH COUNTERFACTUAL ANALYSIS FOR STORAGE CAPACITY

FIELD OF THE INVENTION

Embodiments of the present invention generally relate to analysis of data storage capacity. More particularly, at least some embodiments of the invention relate to systems, hardware, software, computer-readable media, and methods for determining a probability that data storage capacity will be exhausted at a particular time.

BACKGROUND

Typical data storage analytics systems and methods are geared towards forecasting the time when a data storage asset will be at full utilization, that is, when all the data storage capacity of that asset has been used. However, the uncertainty associated with the system workloads often results in poor estimates of that time. For example, one analytics algorithm (DellEMC CloudIQ) for heterogeneous storage arrays fails to consider changing workloads, and also fails to consider changes in data storage utilization patterns, when attempting to generate forecasts as to when a data storage asset will be at full utilization.

For example, currently employed ML (machine learning) techniques for demand forecasting are unable to handle dynamic non-linear data efficiently, since data workloads and data usage patterns are constantly changing. Rather, the user gets only an estimation of a date when the storage is going to be full. Thus, a recommendation for storage expansion is based purely on the outcome of time series forecast.

In more detail, typical approaches exhibit a lack of adaptability in considering influential instances of the storage array. For example, in the EMC DataDomain platform, the overall capacity usage may be affected, to varying degrees of influence, by factors such as a data de-duplication ratio, data compression, space reclamation after garbage collection (active/cloud tier), data movement to a cloud-tier, data recall from a cloud-tier, snapshot deletion, and many other contributing factors.

Typical approaches may also be problematic with regard to data handling. For example, such approaches fail to consider the non-linear, and random, dynamics of the data storage system, and make no provision for handling chaotic-time series data.

Finally, typical approaches are limited in that they fail to identify the risk that a storage asset will run out of capacity and, instead, make storage capacity recommendations based only on a prediction as to when storage capacity is expected to be exhausted.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
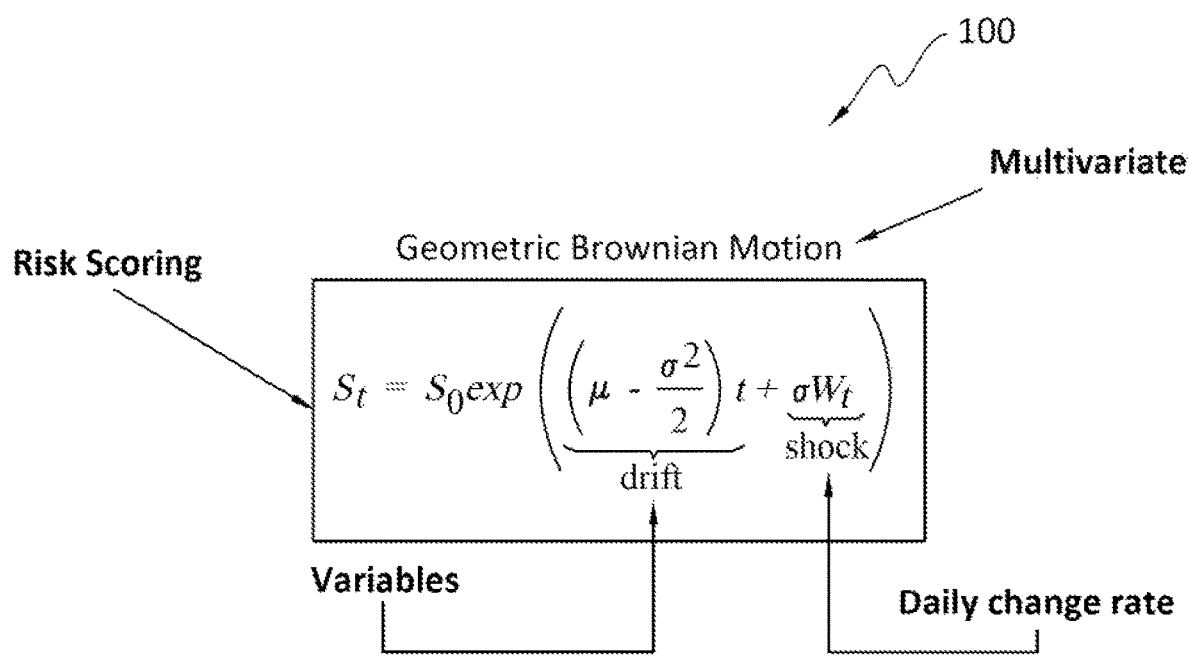
FIG. 1 discloses an equation using Geometric Brownian Motion.

Embodiments of the present invention generally relate to analysis of data storage capacity. More particularly, at least some embodiments of the invention relate to systems, hardware, software, computer-readable media, and methods for determining a probability that data storage capacity will be exhausted at a particular time.

In general, example embodiments of the invention may identify potential influential instances from set of input dataset parameters or attributes, and then identify causal relationships between/among those attributes. These causal relationships may be identified using causal geometric Brownian motion with drift and shock variables. Attributes determined to have a causal relationship may then be fed into a stochastic model configured to evaluate chaotic time series data. Attributes for drift (volatility) may be introduced in each iteration of the stochastic model. Such attributes may include, for example, storage space reclamation after garbage collection, and a deduplication ratio associated with the dataset that is being evaluated.

The stochastic model may operate to forecast the probability of different outcomes, such as when data storage capacity is expected to be exhausted, using random variables in different sets of conditions. The stochastic model may account for unpredictability and randomness that may occur in the system, data, or conditions that are being evaluated or modeled.

The output of the stochastic model may be in the form of a risk score that captures the probability, or set of probabilities, that data storage capacity will be exhausted at one or more particular times. In this way, example embodiments may shift focus from forecasting a single estimate for date of attaining full capacity to predicting the risk associated with running out of storage capacity. Stochastic model outputs, along with the outcome of model-agnostic counterfactual analyses that may consider cause and effect of system behavior, over data growth, may be used as a basis to generate various recommendations.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, at least some embodiments of the invention may predict a probability that a data storage asset will exhaust its capacity at a particular time, or within a particular timeframe, and thus obviate the need to attempt to predict a time when capacity will be exhausted. An embodiment of the invention may take into account the often chaotic, and non-linear, nature of data management system operations, rather than relying on static models, to make predictions as to the probability that a data storage asset will exhaust its capacity at a particular time, or within a particular timeframe. Finally, the use of risk scores that reflect a probability of storage space exhaustion may be a better approach to understand the criticality of ranking which storage subsystem within a datacenter needs to be addressed first. For example, a QA Storage system with a relatively risk score may be prioritized as having a relatively lower criticality as compared to a Production Storage system with a relatively higher risk score. That is, the Production Storage system may be a relatively higher priority for some type of action or remedy due to the fact that it has a higher risk score than the QA Storage system. This is only an example, but in a large datacenter the level of complexity may be much higher.

It is noted that embodiments of the invention, whether claimed or not, cannot be performed, practically or otherwise, in the mind of a human. In connection with the illustrative examples disclosed herein, embodiments of the invention are applicable to, and find practical usage in, environments in which large datasets, such as datasets measured in MB, GB, TB, or PB, are processed and evaluated in a data storage system. Such handling and processing is well beyond the mental capabilities of any human to perform practically, or otherwise. Thus, where simplistic examples are disclosed herein, those are only for the purpose of illustration and to simplify the discussion. As noted above, real world applications typically performance of complex analyses, such as Geometric Brownian Motion, with respect to large, and chaotically changing, datasets. Accordingly, nothing herein should be construed as teaching or suggesting that any aspect of any embodiment of the invention could or would be performed, practically or otherwise, in the mind of a human.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, operations including, but not limited to, data storage capacity evaluation operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Overview

Data storage management, or simply 'storage management,' is one of the most discussed topics across the storage vendors because of its crucial importance to business. Even in a finely-honed backup regime, there are situations of DU/DL because the overall estimation process does not evolve over time with respect to changing workloads. Furthermore, safeguarding high accuracy of capacity forecast estimates along with ease of interpretability and recommendation to the user plays an important role for any customer facing tool.

Today, most of the machine learning and statistical methods used for storage management provide only a point in time when the storage is expected to be full, and in few a cases, typical methods may provide recommendation for adding extra storage or automated ordering of disk drives.

Example embodiments, however, may shift the focus from forecasting a single estimate for the date of attaining full capacity to predicting the risk associated with running out of storage capacity. Example embodiments may address the challenge of dynamic non-linear, i.e., chaotic, time series data by using Geometric Brownian Motion with drift. The volatility (drift) and shock (variance) of the model may be derived by weighted causal features from explainable SHAP (Shapely values) scores. As well, the probabilistic approach employed by some embodiments may be more accurate and credible, for systems with non-linear patterns, as compared, for example, with a regression (Isilon), segmented-regression (Data Domain), or ensemble (CloudIQ), forecasting models. Following are some illustrative examples.

Example 1

Risk Scoring

In an example organization, there may be two sections: Production and Test.

|  | Capacity Utilization - Today | Risk Score - 1 Month from Today |
|---|---|---|
| Production | 1.5 PB of total 2 PB | 86% Risk |
| Test | 1.7 PB of total 2 PB | 73% Risk |

An example embodiment may be able to assign a Risk Score to multiple departments. To illustrate, there may be scenario in which the Test department has only 0.3 PB remaining capacity but the risk score is still less (73%) as compared to a Production (0.5 PB remaining) with 86% risk score. Note that a user may set the future date for which the risk score needs to be calculated.

Example 2

Geometric Brownian Motion and SHAP Score

Some conventional products provide capacity prediction, but do not consider the behavior of the data storage system, and none provide risk score generation. Further, conventional data storage platforms may behave differently from each other. Thus, different capacity prediction approaches may be employed by different platforms. That is, there is no one approach or algorithm that can be effectively employed across multiple different platforms. In contrast, embodiments of the invention may be platform-agnostic, that is, such embodiments may not necessarily be tied to any particular data storage platform and may be applicable to multiple different platforms, even if those platforms display different respective behavior relating to data management.

In general, example embodiments may employ Geometric Brownian Motion (GBM) which may be used to address "Chaotic Time Series" data changes, which may be non-linear, such as exponential, in nature. Thus, any time series pattern may be used as input in example embodiments. The GBM equation that may be used to generate risk scores, discussed in more detail below, may comprise two tunable parameters, namely, drift, and shock or variance. These two parameters may be customized to suit particular data storage platforms and products. Drift derivation may be performed, for example, by assigning a respective SHAP Score, based on game-theoretic method, to each feature or parameter of a specific data storage product, examples of which include, but are not limited to, Dell Data Domain, and Dell PowerMax.

C. Details of Some Example Embodiments

With the foregoing in view, and directing attention now to FIG. 1, a brief overview of aspects of some example embodiments is provided. In general, example embodiments may employ an approach 100 that may involve the use of multivariate Geometric Brownian Motion (GBM), with drift, for generating a Risk Score. A formula for GBM that can be used to determine a risk score '$S_t$' is disclosed in FIG. 1a. As indicated there, the GBM in this embodiment may have two variables, namely, 'drift' and 'shock.' The method to estimate drift and shock for a Primary storage, for example, may be different as compared to a Secondary storage with Deduplication, for example. More generally, methods to estimate drift and shock may vary from one type of storage to another. In general however, Shock may calculated as daily change rate, while Drift is calculated as disclosed below. In one example embodiment, Drift as shown in FIG. 1a may be derived from variables or attributes specific to the data storage platform involved, such as DataDomain or PowerMax for example. Moreover, multiple 'Variables' that may contribute to data storage consumption, and not all variables necessarily contribute to the same extent. Further, an analysis may be performed to determine the respective causal impact of each variable, or subset of variables, that is used as the input. A subset of variables may be selected based on their causal impact, such as if their respective causal impacts individually or collectively meet or exceed a particular threshold. Then, an importance score, or weight, for each variable, or a selected set of variables, may be obtained from a SHAP score. In some embodiments, the SHAP score may serve as the weight. Variables with relatively higher causal impacts may have relatively higher weights, while variables with relatively lower causal impacts may be assigned relatively lower weights. The drift may then be calculated as a weighted average of the SHAP scores or weights.

Figure 2:
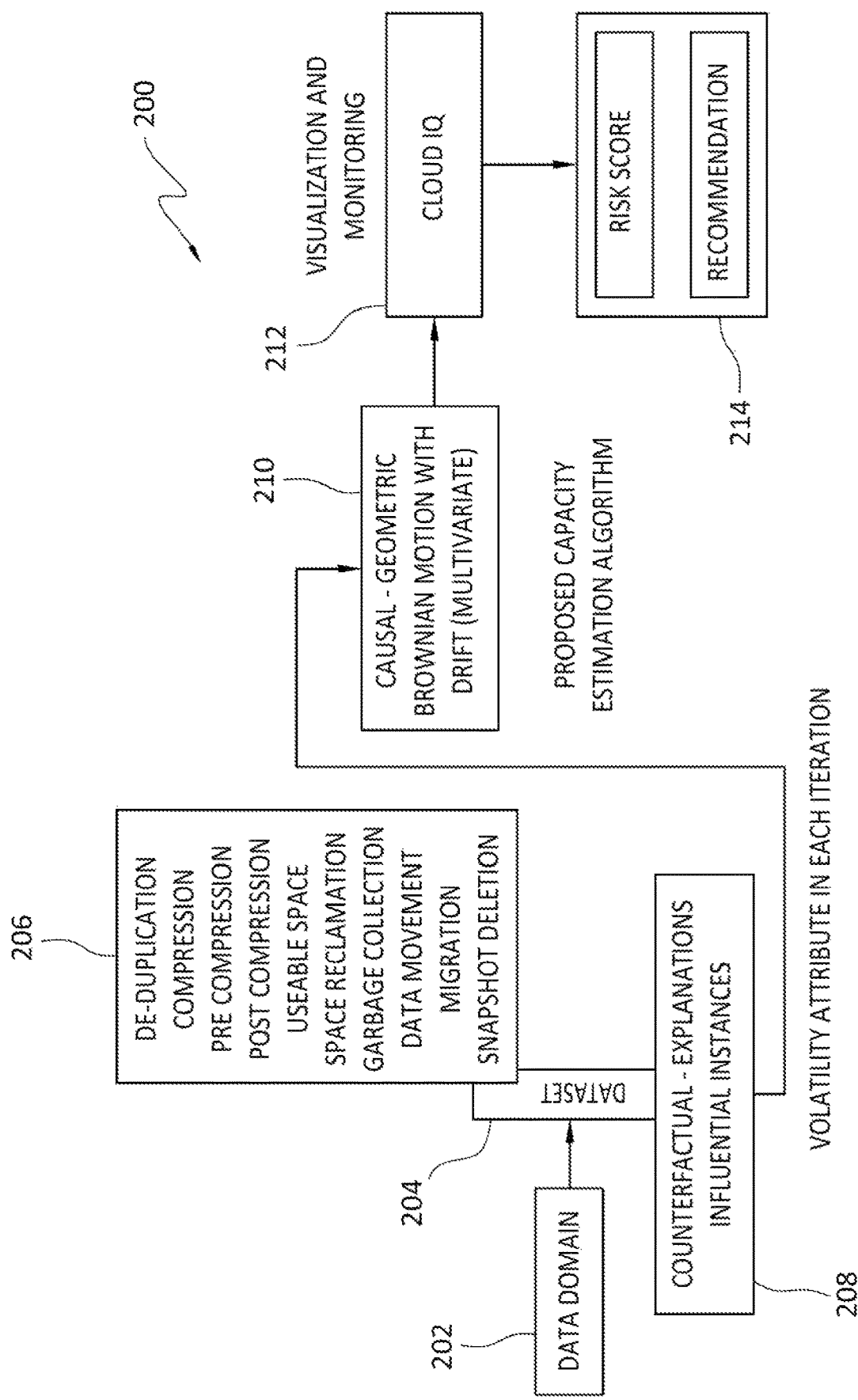
FIG. 2 discloses aspects of an example configuration and method for generating a risk score.

With continued attention to FIG. 1, and directing attention now to FIG. 2 as well, details are provided concerning various aspects of some example embodiments. In general, example embodiments such as are disclosed in FIG. 2 may involve the use of a stochastic-causal algorithm which may implement, among other things: (i) the handling of chaotic time series data considering influential instances; (ii) generation of model-agnostic counterfactual explanation cause and effect of system behavior over data growth; and (iii) quantification of the probability a given storage array will run out of capacity within a certain time period. The risk of running out of data storage capacity may be calculated for any number of different future time frames. In the example of FIG. 1b, there may initially be a lack of awareness as to when a data storage asset will reach full capacity, that is, its ability to store further data is exhausted.

With more particular reference now to FIG. 2, an example configuration 200 is disclosed for generating a risk score, that is, a probability that a given data storage asset will exhaust its capacity at a particular time, or within a particular timeframe. As shown in FIG. 2, embodiments of the invention may be employed in a data storage environment 202, such as the EMC DataDomain environment for example, although no particular operating environment is required for any embodiment. One or more datasets 204 may be generated and/or stored in the data storage environment 200.

Various parameters 206 of the data storage environment 200 may be associated with the dataset 202. These parameters 206 may relate to, or comprise, processes that may be performed at various times with respect to the dataset 204, such as during/after data ingestion to the data storage environment 202, and/or while the data is residing in the data storage environment 202. The parameters 206 may include, for example, data deduplication, data compression, pre-compression of data prior to storage, post-compression of data after storage, space reclamation garbage collection, data movement, data migration, snapshot deletion, and any other data processes and data changes disclosed herein. The processes, or any subset of the processes, associated with the parameters 206 may be performed in a variety of manners. For example, such processes may be performed randomly. As another example, the processes may overlap in time with each other, or may be performed serially, or in parallel. No particular set of parameters 206, nor the manner in which the associated processes are performed, is necessarily employed in connection with any particular embodiment. Further, there may, or may not, be causal relationships between or among two or more processes. Such causal relationships, if any, may be identified by methods disclosed elsewhere herein.

Depending upon the embodiment, any one or more of the parameters 206 may be selected as inputs to a process for determining a risk score. In general, the parameters 206 may be ranked, such as by assigning a corresponding SHAP score to each parameter, and then ranking the parameters in descending order according to their respective SHAP scores. The top few parameters, such as the parameters with the top 1 to 4 SHAP scores for example, may be identified as the most significant contributors to the overall growth, which may or may not be linear in nature, in storage consumption in the data storage environment 202. More generally, any group of parameters may be selected. The SHAP scores may be employed as a weighting scheme for the parameters. For example, a parameter with a relatively higher SHAP score may have greater weight than a parameter with a relatively lower SHAP score.

As further indicated in FIG. 2, the various parameters 206 that have been selected, such as based on their SHAP scores or other weighting scheme, may be fed as inputs into a counterfactual analysis 208. Thus, counterfactual analyses may not necessarily be performed with respect to all parameters 206, but only selected parameters 206, at least in some embodiments. Note that the selected parameters 206 that are input to the counterfactual analysis 208 may vary from one occasion to another, and need not be the same each time an evaluation of the data storage environment 202 is performed. Moreover, the counterfactual analysis 208 may be omitted in some embodiments.

With continued reference to FIG. 2, the volatility (drift) and shock (variance) of the GBM model 210 may be derived using weighted causal features from the SHAP scores. In some embodiments, the output of the GBM model 210, which may include a risk score generated by the GBM model 210 based on various parameters 206 and their associated SHAP scores or other weights, may be provided to a visualization and monitoring platform 212. In general, the risk score indicates, the probability that data storage capacity, such as in the data storage environment 200, will be exhausted at a particular time or within a particular timeframe. Note that some embodiments of the invention may provide for integration of capabilities such as risk score generation into conventional monitoring platforms, such as the DellEMC Cloud IQ platform for example. Using the risk score information, the visualization and monitoring platform 212 may generate an output 214 that includes the risk score and one or more associated recommendations.

D. Aspects of an Example Method

Figure 3:
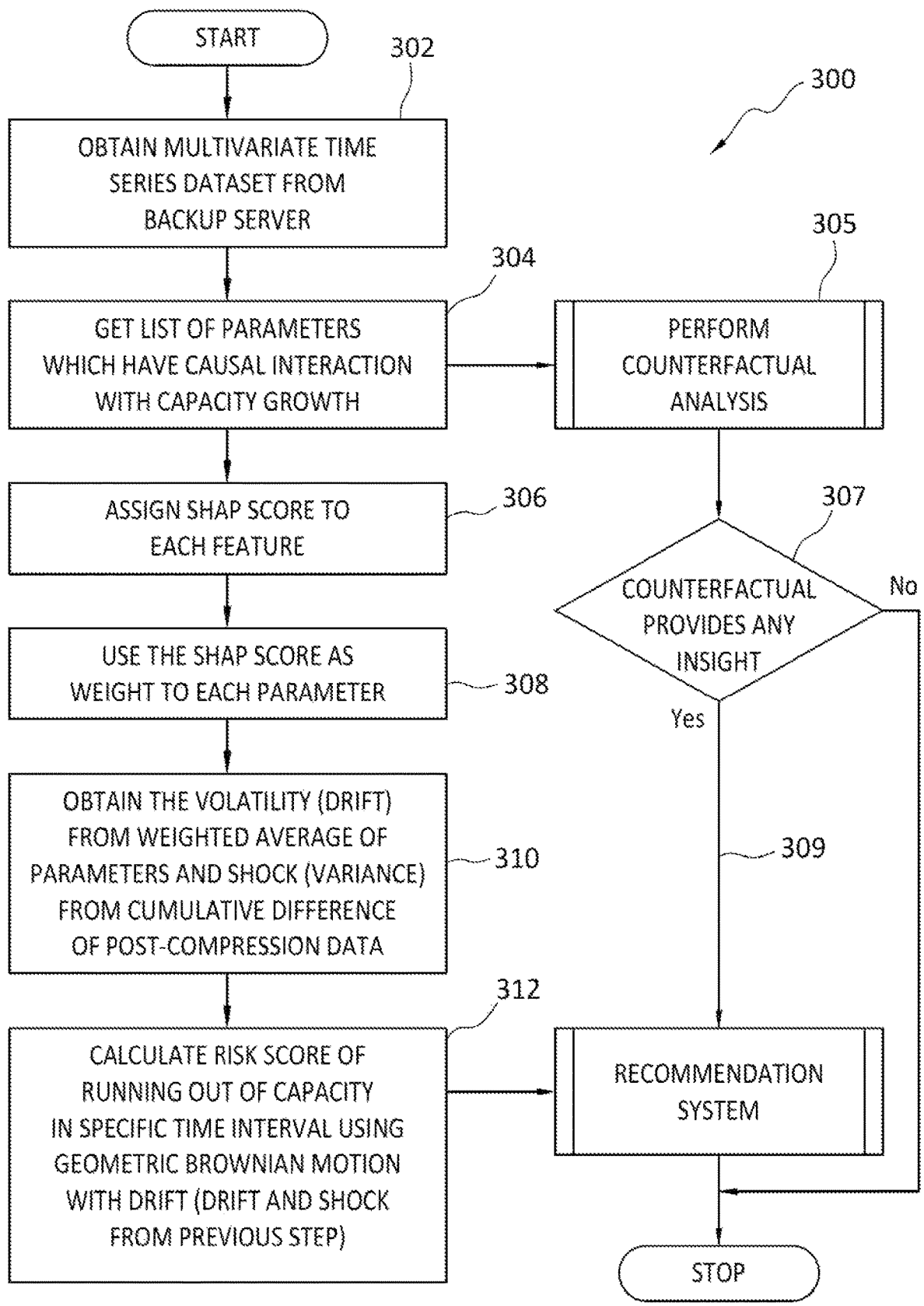
FIG. 3 discloses aspects of another method for generating a risk score.

It is noted with respect to the example method of FIG. 3 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

With reference now to FIG. 3, further details are provided concerning some example embodiments, one of which is implemented as the method 300. In general, the example method 300 may implement an approach in which potential influential instances that may affect data storage consumption are identified from a set of input dataset parameters. Causal relationships among the parameters may then be identified and fed into a stochastic model that employs a multivariate GBM approach. The multivariate GBM approach may include both drift and shock variables, one or both of which may be introduced in each iteration of the method. Parameters, which may also be referred to herein as attributes, affecting drift may include, for example, space reclamation after garbage collection, and a deduplication ratio. A GBM calculation may then be performed to generate a risk score that indicates the risk that a data storage asset will run out of capacity at a particular time, or during a particular timeframe.

In more detail, the example method 300 may begin at 302 when a multivariate time-series dataset is obtained from an entity such as a backup server for example. As noted earlier in connection with the discussion of FIG. 2, the growth of the dataset may be influenced by various attributes, or parameters. Thus, at 304, a list of parameters may be generated. In particular, the list may include those parameters whose causal interaction with each other has contributed to the growth of the dataset and, thus, the amount of storage capacity needed to hold the dataset. All parameters need not be included in the list. Rather, the list may consist only of those parameters whose causal interaction with one or more other parameters has made a material contribution, as defined by a user for example, to the growth of the dataset.

A SHAP score may then be assigned 306 to each of the parameters in the list. The assigned SHAP scores may be used 308 as weights of the respective parameters to which they have been assigned. The weights may be ranked, for example, in descending order.

Next, the volatility (drift) and shock (variance) of the dataset may be obtained 310. In particular, the volatility in the dataset may be determined based on a weighted average of the SHAP scores corresponding to the listed parameters. Additionally, the shock (variance) in the dataset resulting from one or more parameters, such as a cumulative difference of post-compression data, is determined.

When the drift and shock of the dataset have been determined, a risk score may be calculated 312 using GMB with the drift and shock determined at 310. More particularly, a risk score indicative of the probability that the data storage capacity of a data storage asset will be exhausted at a particular time, or within a particular timeframe or time interval, may be calculated.

With continued reference to the example of FIG. 3, some embodiments may provide for the performance of a counterfactual analysis 305 based on the list of parameters obtained at 304. If it is determined 307 that the counterfactual analysis 305 provides insight as to the probability that the data storage capacity of a data storage asset will be exhausted in a particular time interval, such insight(s) may be provided 309 to a recommendation system. On the other hand, if no useful insights are obtained from the counterfactual analysis 305, the method 300 may terminate after the recommendation system has generated a recommendation. Thus, in the example of FIG. 3, a recommendation system may generate a recommendation based solely on the generated 312 risk score, or based on a combination of the generated risk score and insights provided by the counterfactual analysis 305.

E. Aspects of Example Causal Relationships and Counterfactuals

Figure 4:
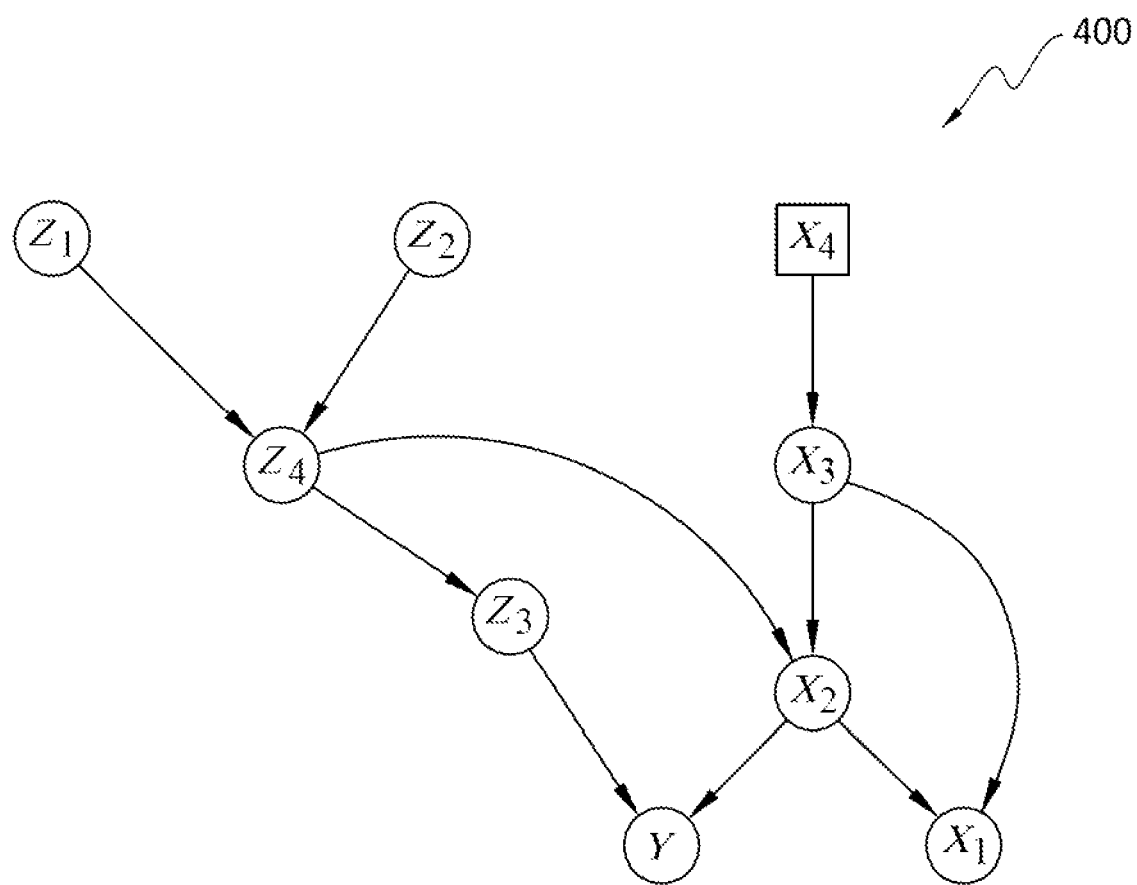
FIG. 4 discloses an example map of causal relationships of dataset attributes.

Turning next to FIG. 4, details are provided concerning the extraction of parameters or attributes, and the determination of causal relationships between/among those attributes. In particular, Table 1 below includes an example listing of such attributes, each of which has been designated with an 'Element' identifier. In the example case where an embodiment of the invention is employed in connection with a DataDomain data storage environment, the attributes listed below may be pulled from DataDomain and the autosupport.

TABLE 1

| Elements | Attributes |
| --- | --- |
| Y | Storage Utilization (%) |
| X1 | Deduplication ratio (numeric) |
| X2 | total_post_compression_used (GB) |
| X3 | Daily precompression (GB) |
| X4 | Workload pattern (types) |
| Z1 | Snapshot deletion (GB) |
| Z2 | Data movement (GB) |
| Z3 | post_compression_used after space reclamation (GB) |
| Z4 | Space reclamation after garbage collection (GB) |

Figure 5:
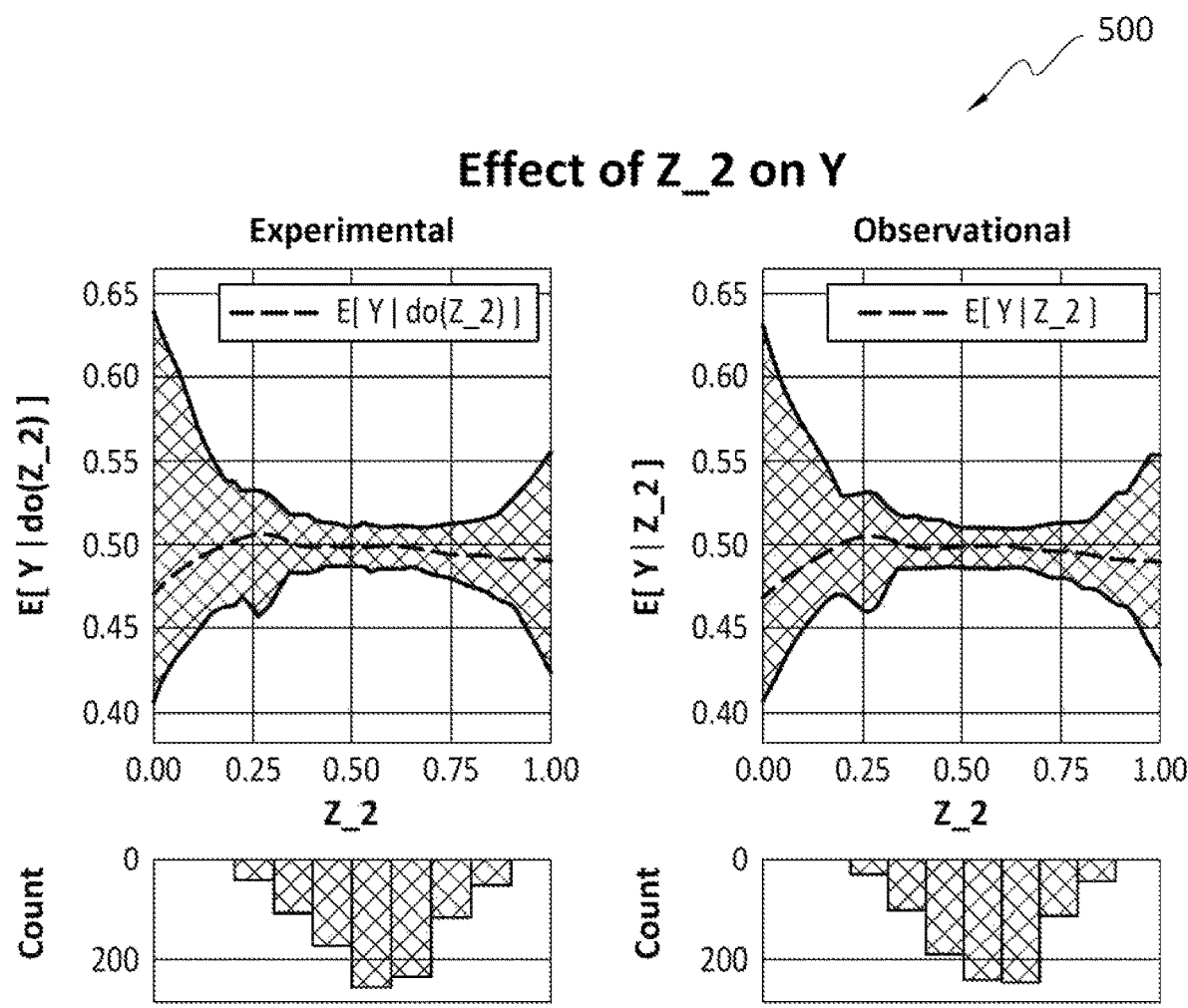
FIG. 5 discloses effects of an example causal relationship.

As shown in the example map 400 in FIG. 4, various attributes listed in Table 1 have a causal relationship with one or more other attributes. To illustrate, performance of Z1 and Z2 in connection with Z4 causes the performance of Z3. The performance of Z3 and X2, in turn, results in the generation of a value for Y. As another example, the performance of X4 in connection with X3 results in the performance of X2. X1 may result simply from the performance of X3 and/or from performance of X3 and X2. As a final example, X2 may result from Z4 and/or X3. As these examples illustrate, one of the attributes may be dependent upon one or more other attributes, and that one attribute may also cause the performance of other attributes. In an illustrative example, FIG. 5 includes various plots 500 that indicate the effect of Z2 on Y.

Causal relationships may be employed in counterfactual analyses. For example a counterfactual explanation may describe a causal situation in the form: "If X had not occurred, Y would not have occurred." For example, and referring briefly to FIG. 4, it can be seen that if Z4 had not occurred, Z3 would not have occurred.

Such 'what if' scenarios may provide useful insights. Suppose, for example, that x_cf is the counterfactual introduced for x[i], delta is the changes made to the actual data points for x[i], and y_cf is the obtained prediction after counterfactual analysis and it will be compared with the actual prediction. This is shown in Table 2 below.

TABLE 2

| Parameter | Description |
| --- | --- |
| x [i] | Given data point for analysis |
| x_cf | Counterfactual introduced for x [i] |
| y_cf | Prediction obtained after counterfactual |
| delta | Changes made to actual data point for x [i] |

An illustrative example is shown below. In a first scenario, and with reference to Table 3 below, suppose that a prediction was a 93.75 risk score, that is, 93.75 percent probability, of storage running out of capacity in the next 90 days. Then a counterfactual analysis is performed thus: if data movement had been performed, and if a deduplication ratio for the data in storage had been 8.65, then the risk of running out of capacity would have been 82.94 (y_cf), which is lower than the initially determined risk of 93.75. Interpreting the outcome of the counterfactual analysis, the administrator can look over the data movement policies and try to determine the reason for the low deduplication ratio.

TABLE 3

|      | data movement (GB) | snapshot deletion (GB) | garbage collection (GB) | dedupe ratio (%) |
|------|--------------------|------------------------|-------------------------|------------------|
| x_cf | 1700.73            | 2.86                   | 14.65                   | 12.32            |
| delta| 473.38             | 0.00                   | 0.00                    | 8.65             |

An administrator may also use the outcome of a counterfactual analysis to identify various actions that may be taken to reduce the risk score, that is, the probability that the data storage asset will be completely filled within a particular time interval. Such actions might include, for example, re-prioritizing the data to be moved in data movement policy, load balancing the workload by obtaining optimal data placement destinations, and reconfiguring backup and data retention policies.

Below is an example code implementation and example of a counterfactual analysis.

```
Code implementation
from ceml.sklearn import generate_counterfactual
    if __name__ == "__main__":
    # Load data
    X, y = load_datadomain_storage_dataset(True)
    X_train, X_test, y_train, y_test = train_test_split(X, y,
test_size=0.33, random_state=4242)
    # Whitelist features - list of features we can change/use when
computing a counterfactual
    #features_whitelist = None # We can use all features
    features_whitelist = get_items(data_movement, snapshot_deletion,
garbage_collection, deduplication_ratio)
    # Create and fit model
    model = DecisionTreeClassifier(max_depth=3)
    model.fit(X_train, y_train)
    # Select data point for explaining its prediction
    x = X_test[-1,:]
    print("Prediction on x: {0}".format(model.predict([x])))
    # Compute counterfactual
    print("\nCompute counterfactual .... ")
    print(generate_counterfactual(model, x, y_target=0,
features_whitelist=features_whitelist))
```

Example 1

```
x = X_test[-1,:]
Prediction on x: [93.75]
Compute counterfactual ....
'x_cf': array([1700.73, 2.86, 14.65, 12.32])
'y_cf': 82.94
'delta': array([473.38, 0, 0, 8.65])
```

F. Aspects of Example Risk Scoring Algorithms

Stochastic models as disclosed herein may implement useful functionalities by virtue of some of their capabilities and properties. One such property accounts for a 'constrained random walk'—in a data center, it may occur that administrators are continually improvising the random data events and requests. Another such property accounts for a 'dynamic non-linear system'—in a datacenter, shelves can be added, data migrations performed, and workload patterns changed.

As noted earlier, FIG. 3 discloses an example risk scoring method that uses GBM, and calculation of the drift (volatility) parameter, and the shock (daily change rate of storage utilized by the dataset) parameter. Following are details concerning processes for determining, or a least approximating, drift and shock. To estimate the drift (volatility) unexpected changes causing storage utilization), and shock (variance), for the below equation of Brownian motion, an ensemble of methods may be employed.

Turning first to the drift (o), and as noted herein, the attributes having a causal impact on overall data growth and, thus, data storage consumption, and the values for weights are obtained from ranking the attributes using SHAP scores (see, e.g., Shapely values at https://en.wikipedia.org/wiki/Shapley value), and then assigning the weight to each feature for calculating the overall volatility of the system, as imparted by those attributes. Particularly, SHAP scores may be obtained for each attribute, and the SHAP scores then translated into a respective weight for the attribute to which the SHAP score applies. Below is an example method for estimating the volatility ($\sigma$).

Particularly, in this example, two attributes are employed for estimating the volatility ($\sigma$), of the system and assign weight as below:

$$w_{i_{deduplication}} = 0.7 \text{(value from } SHAP \text{ score)}$$

$$w_{i_{space\_reclamation}} = 0.3 \text{(value from } SHAP \text{ score)}$$

$$\sigma = \bar{x} = \frac{\sum_{i=1}^{n} w_i x_i}{\sum_{i=1}^{w} w_i}$$

Next, with respect to the shock variable (variance $\mu$), a daily change rate of data storage utilization may be used for calculating the variance, as shown in the equation below.

$$\mu = \frac{U_{post\_comp}(t) - U_{post\_comp}(t-1)}{U_{post\_comp}(t-1)}$$

Figure 6:
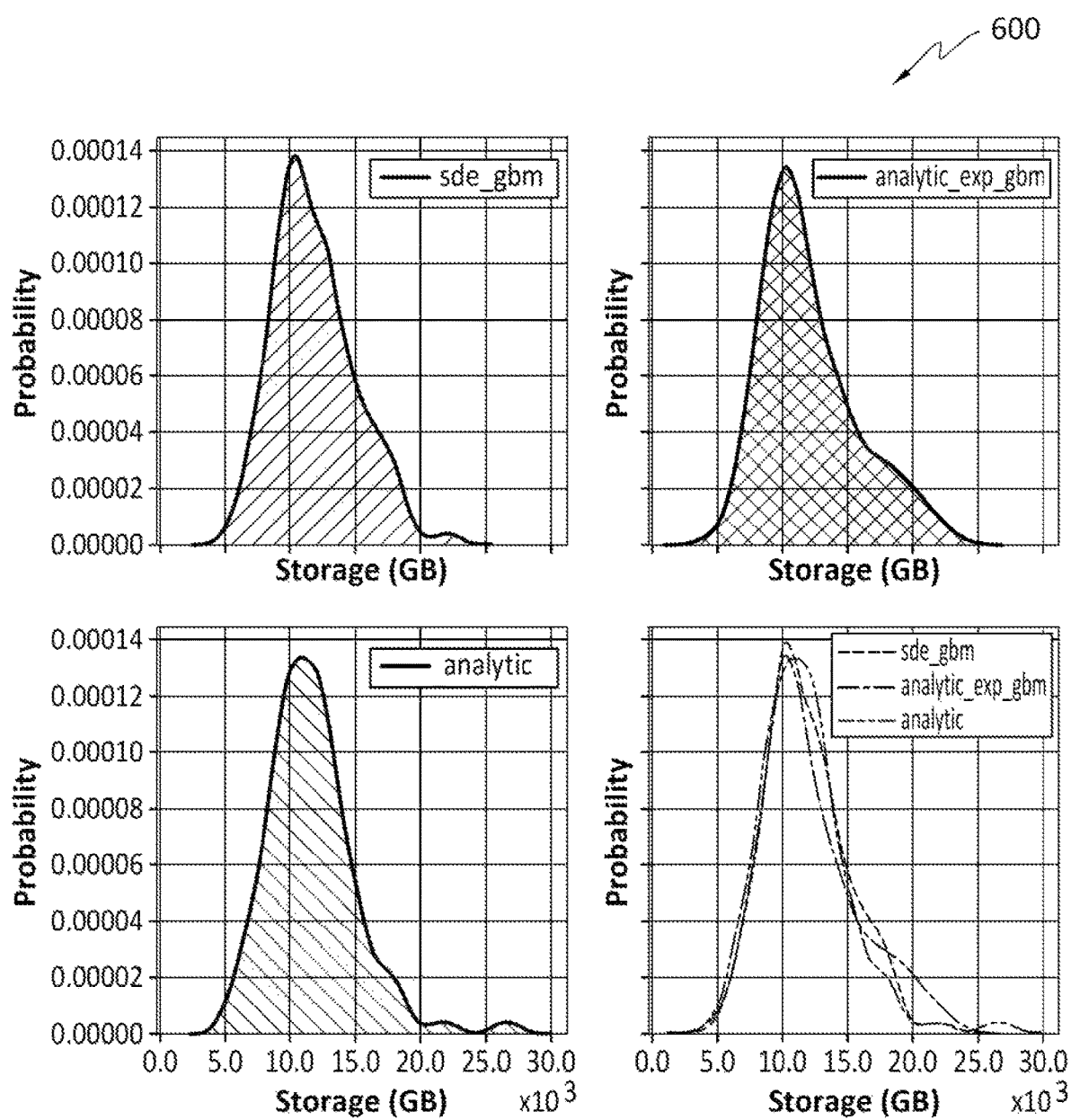
FIG. 6 provides a comparison of various approaches to storage capacity evaluation.

$U_{post\_comp}(t)$=Post compression storage utilization at current time, and $U_{post\_comp}(t-1)$=Post compression storage utilization at previous point in time With reference now to FIG. 6, some comparative results are shown. In general, the results show an estimated risk score (probability) (y-axis) as a function of the amount of storage consumed in GB (x-axis). The comparison 600 of variants of Causal-GBM is set forth in Table 4 below, where one embodiment according to the invention is denoted 'causal_analytic_GBM.'

| Measuring Accuracy | | | |
|---|---|---|---|
| | sde_GBM | analytic | causal_analytic_GBM |
| Mean (GB) | 32451 | 33125 | 32352 |
| Error Mean (%) | NA | 0.75 | 0.46 |
| $\sigma$ | 13762 | 13840 | 13754 |
| relative_$\sigma$ | NA | 1.7 | 0.26 |

Figure 7:
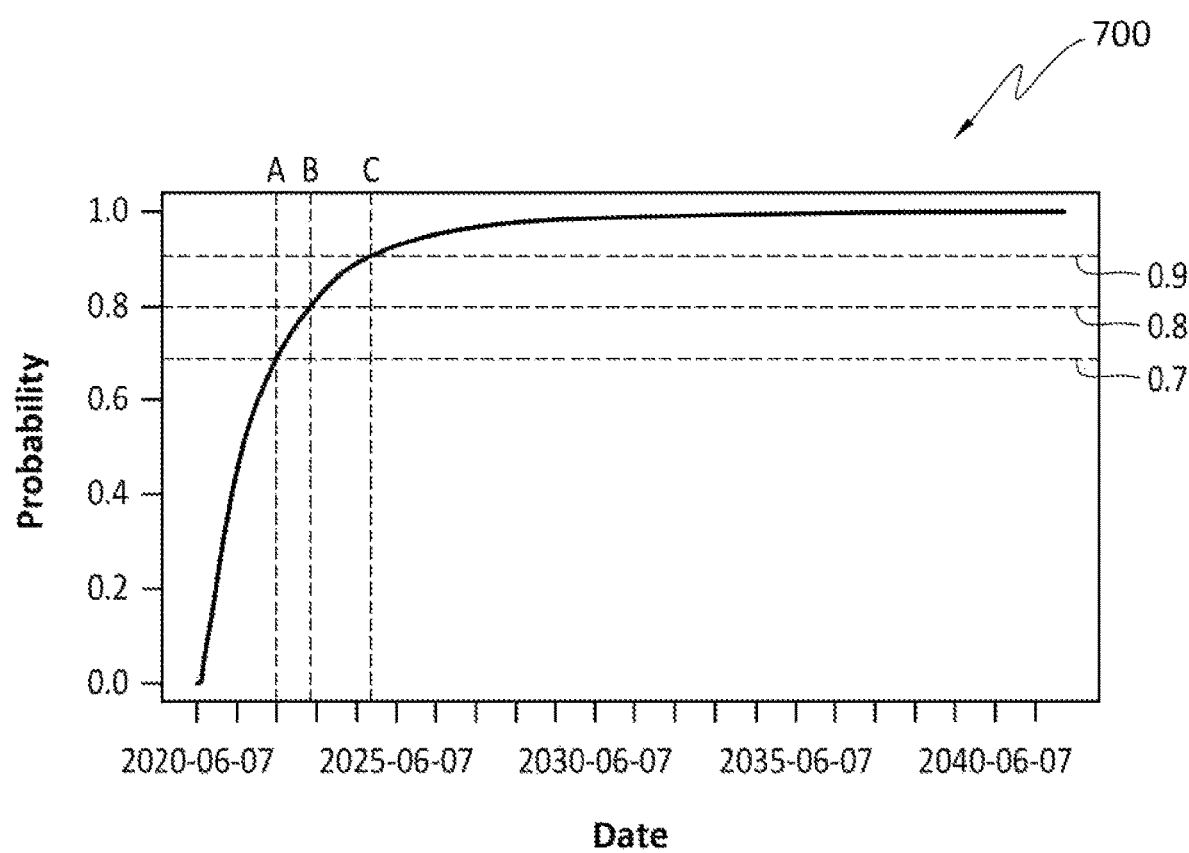
FIG. 7 discloses a plot of probabilities as a function of time.

Turning next to FIG. 7, an example plot 700 is shown in which the risk score is plotted as a function of time. Particularly, the model indicates a probability or risk of exceeding the storage capacity, rather than a specific time or date on which the storage capacity will be exceeded. For example, a calculated probability of 90% may refer to a 90% chance that the storage capacity will be exceeded in the next 'n' days.

A user may set, for example, various risk thresholds, such as Risk Threshold 1, Risk Threshold 2 and Risk Threshold 3. Considering the present day and risk estimation that the store will run out of capacity (95%), the inferences below may be drawn with the proposed method.

Risk Low—70% Probability on Day A
Risk Medium—80% Probability on Day B
Risk High—90% Probability on Day C G. Aspects of Example Applications and Use Cases Embodiments of the invention may be applied to a variety of resources, including storage, CPU, and memory, or any other resource with a finite capacity that may be used in whole or in part over time. As noted herein, embodiments of the method may be applied to hardware resource demand in a data center. As the method will work even with small dataset, it may an optimal choice considering the tradeoff between compute resources and desired accuracy.

As another example, embodiments of the invention may be employed in connection with backup policies concerning scheduling. For example, an optimal method of job scheduling may be one in which the backup job does not time-out within the specified backup window. Initially, an estimate may be made as to the future incoming data from the client using the disclosed methods. The capacity trend of the backup server may then be evaluated using an embodiment of the invention. Understanding the behavior on both sides of the backup job may help to create an effective job scheduling which will adhere to the RPO and policies. For example, if a daily backup schedule is shown to increase a risk that storage capacity will be exhausted at some point during a particular time interval, it may be advisable to switch to less frequent backups, or only incremental backups, so as to reduce the speed with which the storage space is exhausted.

In another example, embodiments of the invention may find application in risk mitigation and optimal planning (manual and automated) in large scale data centers. As noted herein, in a data storage context, existing capacity planning method used by storage vendors are unable to identify the risk score and, unlike embodiments of the invention, cannot perform what-if scenarios in which the likelihood of storage capacity, or a specified portion of storage capacity, being consumed within a specified time interval. Embodiments of the invention may be applied to other environments and are not limited to use in storage environments. For example, in a testing environment, even if capacity consumption exceeds more than 90%, the risk score, as set by an administrator, may be less since the environment is a testing environment rather than a production environment. That is, the significance of running out of storage in a test environment may be less than the significance of running out of storage in a production environment. Thus, the acceptable risk scores may have different values, or different meanings, in different environments.

Example embodiments may be well suited for use in chaotic environments. For example, in the case of the DellEMC PowerProtect and PowerMax data management platforms, customers may use those platforms to protect as much as 96TB-122 TB of data from various sources. Such sources may include, for example, e.g. databases (SAP HANA, Oracle, MS SQL), virtual machines, Kubernetes clusters, and primary storage (PowerMax). When only a single type of application is providing data for backups, the data growth can be estimated. However, with such a diverse set of data sources, such as the aforementioned examples, conventional approaches are inadequate, while embodiments of the invention may be well suited for use with chaotic data environments in which backup data is drawn from multiple, and diverse, sources.

H. Alternative Approaches

Various other approaches have been devised for dealing with the problem of data storage capacity planning, but are inadequate. For example, statistical time series methods are relatively simple to implement, but are characterized by relatively lower accuracy than may be achieved with the example disclosed embodiments.

Another approaches involves machine learning time series methods. However, while such methods may perform with acceptable accuracy in a training mode using test data, they have proven to be of little value in dynamic environments such as those disclosed herein. Auto machine learning methods suffer from similar drawbacks and accordingly are not well suited for use in dynamic and chaotic production environments where data storage capacity forecasting is important.

As a final example, ensemble time series methods have proven acceptable, but only in limited circumstances. Particularly, these methods may work relatively well for a specific product with static parameters. However, this approach is not readily extendible to other platforms without incurring greater errors in accuracy.

I. Further Example Embodiments

Following are some further example embodiments of the invention. These are presented only by way of example and are not intended to limit the scope of the invention in any way.

Embodiment 1

A method, comprising: accessing a dataset; selecting a list of attributes of the dataset, each of the attributes being selected based on a determination that the attribute is affecting growth of the dataset and affecting an amount of data storage space consumed by the dataset; assigning a SHAP score to each attribute; using the SHAP scores to assign respective weights to each attribute; deriving drift and shock information for the dataset; and based on the drift and shock information, calculating a risk score that a storage capacity of an asset where the dataset is stored will be exhausted within a particular time interval.

Embodiment 2

The method as recited in embodiment 1, wherein the risk score comprises a probability that the storage capacity of the asset where the dataset is stored will be exhausted within the particular time interval.

Embodiment 3

The method as recited in any of embodiments 1-2, wherein the drift is determined based on a weighted average of the attribute weights, and the shock is determined based on compression of data in the dataset.

Embodiment 4

The method as recited in any of embodiments 1-3, wherein a size of the dataset changes nonlinearly over time.

Embodiment 5

The method as recited in any of embodiments 1-4, wherein the risk score is calculated using Geometric Brownian Motion.

Embodiment 6

The method as recited in any of embodiments 1-5, further comprising identifying one or more causal relationships among the attributes of the dataset, and the attributes of the dataset are selected based in part on the causal relationships.

Embodiment 7

The method as recited in any of embodiments 1-6, further comprising performing a counterfactual analysis, and when the counterfactual analysis provides insight as to the amount of storage needed by the dataset, using the risk score and results of the counterfactual analysis to generate a recommendation.

Embodiment 8

The method as recited in any of embodiments 1-7, wherein the shock information comprises a periodic change rate of consumption of storage space of the asset by the dataset.

Embodiment 9

The method as recited in any of embodiments 1-9, wherein the drift information comprises information concerning unexpected changes in the dataset that affect an amount of storage consumed by the dataset.

Embodiment 10

The method as recited in any of embodiments 1-9, wherein the drift information is derived based in part on space reclamation after a garbage collection process is performed with respect to the dataset, and based in part on a deduplication ratio of the dataset.

Embodiment 11

A method for performing any of the operations, methods, or processes, or any portion of any of these, disclosed herein.

Embodiment 12

A non-transitory storage medium having stored therein instructions that are executable by one or more hardware processors to perform operations comprising the operations of any one or more of embodiments 1-11.

J. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
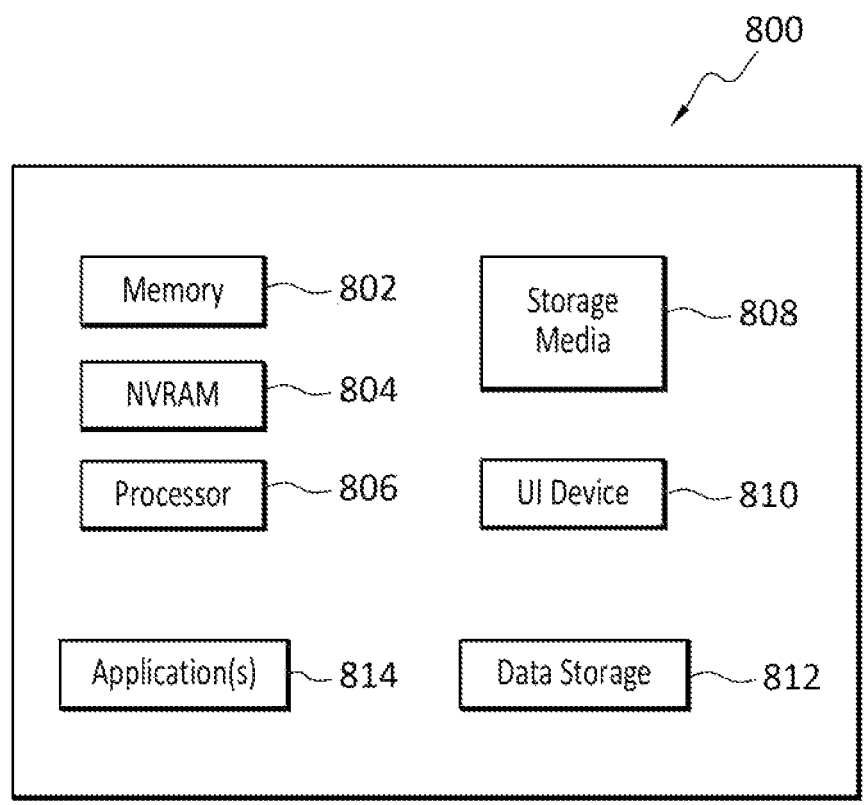
FIG. 8 discloses aspects of an example computing entity that may perform any of the disclosed methods and processes.

With reference briefly now to FIG. 8, any one or more of the entities disclosed, or implied, by FIGS. 1-7 and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 802 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
accessing a dataset;
selecting a list of attributes of the dataset, each of the attributes being selected based on a determination that the attribute is affecting growth of the dataset and affecting an amount of data storage space consumed by the dataset;
assigning a SHAP score to each attribute;
using the SHAP scores to assign respective weights to each attribute;
deriving drift and shock information for the dataset, and the drift and shock information is derived from the SHAP scores;
based on the drift and shock information, calculating a risk score that a storage capacity of an asset where the dataset is stored will be exhausted within a particular time interval; and
using the risk score as a basis to identify, and implement, an action to reduce a risk that the storage capacity of the asset will be exhausted within the particular time interval.

2. The method as recited in claim 1, wherein the risk score comprises a probability that the storage capacity of the asset where the dataset is stored will be exhausted within the particular time interval.

3. The method as recited in claim 1, wherein the drift is determined based on a weighted average of the attribute weights, and the shock is determined based on compression of data in the dataset.

4. The method as recited in claim 1, wherein a size of the dataset changes nonlinearly over time.

5. The method as recited in claim 1, wherein the risk score is calculated using Geometric Brownian Motion.

6. The method as recited in claim 1, further comprising identifying one or more causal relationships among the attributes of the dataset, and the attributes of the dataset are selected based in part on the causal relationships.

7. The method as recited in claim 1, further comprising performing a counterfactual analysis, and when the counterfactual analysis provides insight as to the amount of storage needed by the dataset, using the risk score and results of the counterfactual analysis to generate a recommendation.

8. The method as recited in claim 1, wherein the shock information comprises a periodic change rate of consumption of storage space of the asset by the dataset.

9. The method as recited in claim 1, wherein the drift information comprises information concerning unexpected changes in the dataset that affect an amount of storage consumed by the dataset.

10. The method as recited in claim 1, wherein the drift information is derived based in part on space reclamation after a garbage collection process is performed with respect to the dataset, and based in part on a deduplication ratio of the dataset.

11. A non-transitory storage medium having stored therein instructions that are executable by one or more hardware processors to perform operations comprising:
accessing a dataset;
selecting a list of attributes of the dataset, each of the attributes being selected based on a determination that the attribute is affecting growth of the dataset and affecting an amount of data storage space consumed by the dataset;
assigning a SHAP score to each attribute;
using the SHAP scores to assign respective weights to each attribute;
deriving drift and shock information for the dataset, and the drift and shock information is derived from the SHAP scores;
based on the drift and shock information, calculating a risk score that a storage capacity of an asset where the dataset is stored will be exhausted within a particular time interval; and
using the risk score as a basis to identify, and implement, an action to reduce a risk that the storage capacity of the asset will be exhausted within the particular time interval.

12. The non-transitory storage medium as recited in claim 11, wherein the risk score comprises a probability that the storage capacity of the asset where the dataset is stored will be exhausted within the particular time interval.

13. The non-transitory storage medium as recited in claim 11, wherein the drift is determined based on a weighted average of the attribute weights, and the shock is determined based on compression of data in the dataset.

14. The non-transitory storage medium as recited in claim 11, wherein a size of the dataset changes nonlinearly over time.

15. The non-transitory storage medium as recited in claim 11, wherein the risk score is calculated using Geometric Brownian Motion.

16. The non-transitory storage medium as recited in claim 11, further comprising identifying one or more causal relationships among the attributes of the dataset, and the attributes of the dataset are selected based in part on the causal relationships.

17. The non-transitory storage medium as recited in claim 11, further comprising performing a counterfactual analysis, and when the counterfactual analysis provides insight as to the amount of storage needed by the dataset, using the risk score and results of the counterfactual analysis to generate a recommendation.

18. The non-transitory storage medium as recited in claim 11, wherein the shock information comprises a periodic change rate of consumption of storage space of the asset by the dataset.

19. The non-transitory storage medium as recited in claim 11, wherein the drift information comprises information concerning unexpected changes in the dataset that affect an amount of storage consumed by the dataset.

20. The non-transitory storage medium as recited in claim 11, wherein the drift information is derived based in part on space reclamation after a garbage collection process is performed with respect to the dataset, and based in part on a deduplication ratio of the dataset.

* * * * *